(12) United States Patent
Alonso-Rubio et al.

(10) Patent No.: US 8,417,244 B2
(45) Date of Patent: *Apr. 9, 2013

(54) DETECTION OF EARLY INTER-RADIO ACCESS TECHNOLOGY (IRAT) HANDOVER TRIGGERING

(75) Inventors: Jose Alonso-Rubio, Stockholm (SE); Kristina Zetterberg, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 349 days.

This patent is subject to a terminal disclaimer.

(21) Appl. No.: 12/766,148

(22) Filed: Apr. 23, 2010

(65) Prior Publication Data

US 2011/0263255 A1    Oct. 27, 2011

(51) Int. Cl.
*H04W 36/00* (2009.01)

(52) U.S. Cl.
USPC ........... 455/436; 455/437; 455/438; 455/439; 455/440; 455/441; 455/442; 455/443; 455/444; 370/331

(58) Field of Classification Search ........... 455/436–445
See application file for complete search history.

(56) References Cited

U.S. PATENT DOCUMENTS

| 6,507,739 | B1 * | 1/2003 | Gross et al. | 455/431 |
| 2008/0096560 | A1 * | 4/2008 | Felske et al. | 455/436 |
| 2010/0056149 | A1 * | 3/2010 | Jubin et al. | 455/436 |
| 2010/0173626 | A1 * | 7/2010 | Catovic et al. | 455/423 |
| 2010/0173633 | A1 * | 7/2010 | Catovic et al. | 455/436 |

FOREIGN PATENT DOCUMENTS

WO    WO 2009/123512    10/2009

OTHER PUBLICATIONS

Co-pending U.S. Appl. No. 12/690,625, entitled "Method and Arrangement in a Telecommunication System", filed Jan. 20, 2010.

* cited by examiner

*Primary Examiner* — Kamran Afshar
*Assistant Examiner* — Shahriar Behnamian
(74) *Attorney, Agent, or Firm* — Myers Bigel Sibley & Sajovec, P.A.

(57) ABSTRACT

A device detects poor coverage associated with a source radio access technology (RAT) with which the device is connected, and connects to a target RAT. The device also measures the source RAT for a time period after connecting to the target RAT, and sends, based on the measurements, one or more measurement reports to the target RAT, where the target RAT forwards the one or more measurement reports to the source RAT. Alternatively, or additionally, the target RAT may detect that the handover was triggered too early and may inform the source RAT or command the UE to return to the source RAT. The device further stops the measuring and the sending when the time period expires. In this way, IRAT handover parameters may be automatically or manually tuned to minimize the number of handovers triggered too early, which may result in a more efficient cell configuration.

50 Claims, 11 Drawing Sheets

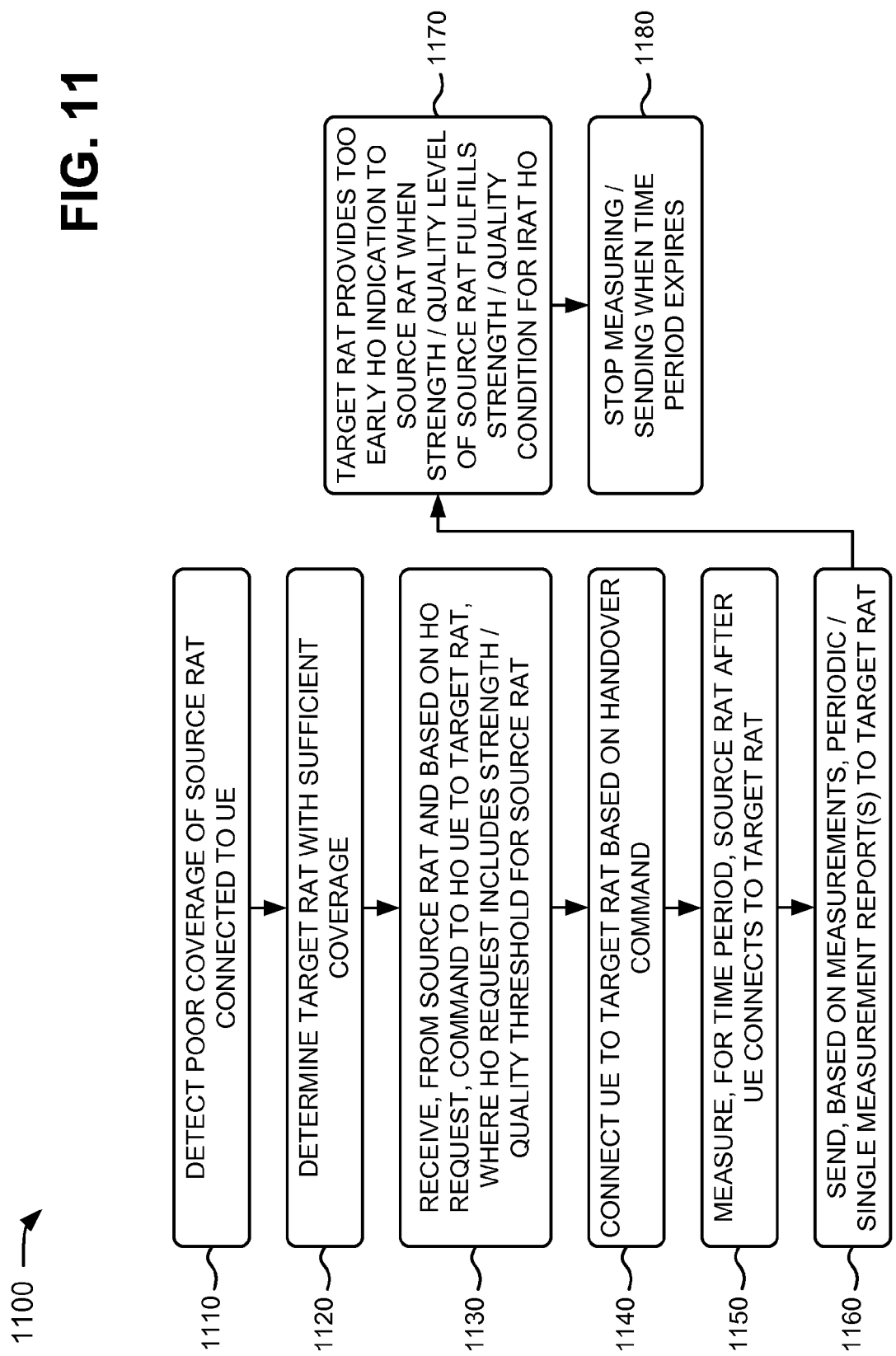

US 8,417,244 B2

DETECTION OF EARLY INTER-RADIO ACCESS TECHNOLOGY (IRAT) HANDOVER TRIGGERING

TECHNICAL FIELD

Embodiments described herein relate generally to communication systems, and, more particularly, to detecting too early inter-radio access technology (IRAT) handover triggering in a telecommunication system.

BACKGROUND

Specification of concepts associated with an Evolved Universal Terrestrial Radio Access Network (E-UTRAN) (e.g., including concepts associated with Long Term Evolution (LTE) and System Architecture Evolution (SAE)) is currently ongoing within the 3rd Generation Partnership Project (3GPP). It is envisioned that E-UTRAN will initially have limited radio coverage. To provide seamless mobility, it is necessary to handover (HO) user equipment (UEs) (e.g., mobile communication devices) in the E-UTRAN to an alternative RAT (e.g., such as a Global System for Mobile communications (GSM) EDGE Radio Access Network (GERAN) or a UTRAN) with better coverage. Generally, it is also preferred for a UE, served by a second generation (2G) network (e.g., such as a GERAN) or a third generation (3G) network (e.g., such as a UTRAN), to switch to (e.g., via a handover) an E-UTRAN once the UE is within the coverage of the E-UTRAN. The E-UTRAN is preferred since higher data rates are offered by the E-UTRAN, which enables services with greater bandwidth requirements. A handover between two different RATs is referred to as an inter-RAT (IRAT) handover.

Network administrators are often responsible for multiple networks which use different RATs that cover overlapping areas at different frequencies. It is also common for at least one of the networks to cover a wider area than other networks, especially at the early stages of deployment of new networks (e.g., such as E-UTRANs).

Moving between different RATs is a demanding process for both a UE and a network. On the UE side, measuring a RAT on a different frequency requires the UE to switch modes, which prevents the UE from sending/receiving information to/from a connected RAT. In addition, when performing RAT measurements, the UE consumes more battery power than during normal operation. On the network side, scheduling needs to be adapted to the restrictions associated with the UE, which affects network efficiency. The restrictions associated with the UE and the network may reduce an end user's experience due to higher latency, a lower data rate, and/or a higher probability of dropped calls during performance of measurements.

If two or more networks have different RATs, a network administrator sets priorities between different networks in order to ensure that UEs connect to the network with the highest performance (e.g., a network with a newest and least deployed RAT). The network administrator also attempts to ensure that when a UE moves from a network area not covered by a source RAT, the UE experiences seamless mobility to a target RAT with overlapping coverage (e.g., a more established and deployed RAT).

A process for IRAT handover triggering from a first (source) RAT (e.g., a LTE network) to a second (target) RAT (e.g., a Wideband Code Division Multiple Access (WCDMA) network) may include one or more of the following steps. If a UE is connected to the first RAT and detects poor coverage of the first RAT, the UE begins IRAT handover measurements and detects the second RAT with good coverage. The UE reports the IRAT handover measurements to the first RAT network, and the first RAT network commands the UE to handover to the second RAT, after receiving an acknowledgement of an IRAT handover request. The UE connects to the second RAT network and sends a handover confirm message to the second RAT network. The second RAT network sends a handover success report to the first RAT network.

One parameter that needs to be controlled (e.g., when triggering an IRAT handover) is an absolute threshold that defines when the first RAT coverage is becoming poor and IRAT handover measurements are needed. If the setting of this threshold is not optimal, an end user's experience may be degraded. For example, if the IRAT handover measurement is triggered too late, the UE may not be able to report the IRAT handover measurements to the first RAT network or may not be able to receive the handover command due to a heavily degraded connection with the first RAT (e.g., resulting in a radio link failure). If the IRAT handover measurements are triggered too early, the UE may not find a second RAT network with good coverage or the first RAT network coverage may recover soon after the IRAT handover measurement was triggered. In both cases, the IRAT handover measurement will not be used for any purpose, a handover to a lower priority RAT may be unnecessarily triggered, or the call would be dropped (e.g., due to the more demanding task of measuring other RATs while maintaining a connection with a serving RAT) resulting in an inefficient use of the networks.

In an early stage of network deployment, coverage is provided only in hot-spots and it is important to permit UEs to move to a lower priority network with wider coverage (e.g., the IRAT handover measurements are triggered as soon as poor coverage is detected). As new networks are deployed, full coverage may be provided in most areas and it is important to ensure that IRAT handover is triggered only in edge cells (e.g., cells in the middle of a coverage area will not need to trigger IRAT handover). In some instances, cells may initially provide coverage in a hot spot, and, as the network deployment develops, the cells may end up being located far from the edges of the network. Since optimizing values of the IRAT handover parameters (e.g., per cell) is an expensive process, it is typical that default parameters are used for an entire life cycle of a cell.

In order to avoid radio link failure, network administrators often set requirements on RAT coverage too high (e.g., the threshold defining poor coverage for a RAT may be set to a too restrictive value), resulting in too early IRAT handover triggering and inefficient use of the network. Typically, it is safer to trigger the IRAT handover too early, rather than too late, because triggering the IRAT handover too late results in radio link failure.

Setting requirements on RAT coverage in such a manner may be beneficial for cells partially covering areas that need several RATs in order to provide full coverage. However, setting requirements on RAT coverage too high leads to an inefficient use of a highest priority network for centrally-located cells (e.g., where IRAT handover is unnecessary) because a UE that is handed over to a lower priority RAT will in most cases not return to the highest priority RAT until poor coverage is detected or until the UE enters an idle mode (e.g., via cell reselection).

This situation may be corrected (e.g., manually or automatically) by lowering the poor coverage threshold on cells experiencing too early IRAT handover triggering. However, detection of a too high coverage threshold is not currently possible. For example, a network may include two LTE cells (e.g., cell LTE-A and cell LTE-B). Cell LTE-A may be a border cell and may include optimal settings for IRAT handover triggering. When coverage of cell LTE-A falls below a threshold, UEs may be handed over to WCDMA network in a seamless manner. Cell LTE-B may be a center cell and may include a poor coverage threshold that is set too high. When coverage of cell LTE-B temporarily drops, UEs may be handed over to the WCDMA network unnecessarily. If the poor coverage threshold was set lower, the UEs would continue in cell LTE-B without any negative effects.

In this example, both cells (e.g., cell LTE-A and cell LTE-B) experience normal operation, no radio link failure occurs, and every IRAT handover is successfully completed. Currently, however, there is no mechanism for cell LTE-A to verify that it was a good decision to handover the UEs to the WCDMA network, and there is no mechanism for cell LTE-B to determine that the handovers of the UEs to the WCDMA network were triggered too early. As a consequence, no manual and/or automatic tuning can be performed.

SUMMARY

It is an object of the invention to overcome at least some of the above disadvantages, and to provide systems and/or methods for detecting IRAT handovers that are triggered too early in a telecommunication system.

An embodiment described herein may provide a method in a network that includes a user equipment. The method may include detecting, by the user equipment, poor coverage associated with a source radio access technology (RAT) with which the user equipment is connected, and connecting the user equipment to a target RAT when the poor coverage is detected. The method may also include measuring, by the user equipment, the source RAT for a time period after the user equipment connects to the target RAT, and sending, by the user equipment and based on the measurements, one or more measurement reports to the target RAT.

Another embodiment described herein may provide a user equipment in a network. The user equipment may include a memory to store a plurality of instructions, and a processor to execute instructions in the memory to detect poor coverage associated with a source radio access technology (RAT) with which the user equipment is connected, and connect the user equipment to a target RAT when the poor coverage is detected. The processor may further execute instructions in the memory to measure the source RAT for a time period after the user equipment connects to the target RAT, and send, based on the measurements, one or more measurement reports to the target RAT.

Still another embodiment described herein may provide a method in a network that includes a user equipment connected to a source radio access technology (RAT), where the user equipment connects to a target RAT when poor coverage is detected in the source RAT. The method may include instructing the user equipment to measure at least one of a signal strength and/or a signal quality associated with the source RAT for a time period after the user equipment connects to the target RAT; instructing the user equipment to send, based on the measurements, one or more measurement reports to the target RAT; and determining, by the source RAT, whether an inter-RAT (IRAT) handover to the target RAT was triggered too early.

A further embodiment described herein may provide a method in a network that includes a user equipment connected to a source radio access technology (RAT), where the user equipment connects to a target RAT when poor coverage is detected in the source RAT. The method may include instructing the user equipment to measure at least one of a signal strength and/or a signal quality associated with the source RAT for a time period after the user equipment connects to the target RAT, and receiving, by the target RAT and from the user equipment, one or more measurement reports generated based on the measurements.

Still a further embodiment described herein may provide A device in a source radio access technology (RAT) connected to a user equipment, where the user equipment connects to a target RAT when poor coverage is detected in the source RAT. The device may include a memory to store a plurality of instructions, and a processor to execute instructions in the memory to: instruct the user equipment to measure at least one of a signal strength and/or a signal quality associated with the source RAT for a time period after the user equipment connects to the target RAT, instruct the user equipment to send, based on the measurements, one or more measurement reports to the target RAT, and determine whether an inter-RAT (IRAT) handover to the target RAT was triggered too early.

Another embodiment described herein may provide a device in a target radio access technology (RAT) connected to a user equipment, where the user equipment connects to a target RAT when a problem occurs in a source RAT. The device may include a memory to store a plurality of instructions; and a processor to execute instructions in the memory to: instruct the user equipment to measure at least one of a signal strength and/or a signal quality associated with the source RAT for a time period after the user equipment connects to the target RAT, and receive, from the user equipment, one or more measurement reports generated based on the measurements.

Systems and/or methods described herein may provide mechanisms to detect too early IRAT handover triggering (e.g., which was previously undetectable) and to mitigate too early IRAT handover triggering in the future. The systems and/or methods may enable automatic or manual tuning of IRAT handover parameters to minimize the number of handovers triggered too early, which may result in a more efficient cell configuration. The systems and/or methods may, for example, instruct a UE (e.g., for which an IRAT handover, from a source RAT to a target RAT, was triggered) to continue measuring the source RAT and the target RAT for a time period after the IRAT handover. The systems and/or methods may instruct the UE to send a measurement report (e.g., based on the measurements of the source and target RATs) to the target RAT after the time period expires. Upon reception of the measurement report, the target RAT may forward the measurement report to the source RAT. Alternatively, or additionally, the target RAT may trigger a second IRAT handover to the source RAT even if a poor coverage threshold (e.g., for triggering IRAT handover) is not satisfied. The source RAT may detect that the IRAT handover was triggered too early based on the UE returning to the source RAT. In another alternative, the target RAT may detect that the IRAT handover was triggered too early and may send a too early IRAT handover indication to the source RAT.

BRIEF DESCRIPTION OF THE DRAWINGS

FIG. 11 is a flow chart of still another example process for detecting too early IRAT handover triggering in a telecommunication system according to embodiments described herein.

DETAILED DESCRIPTION

The following detailed description refers to the accompanying drawings. The same reference numbers in different drawings may identify the same or similar elements. Also, the following detailed description does not limit the invention.

Figure 1:
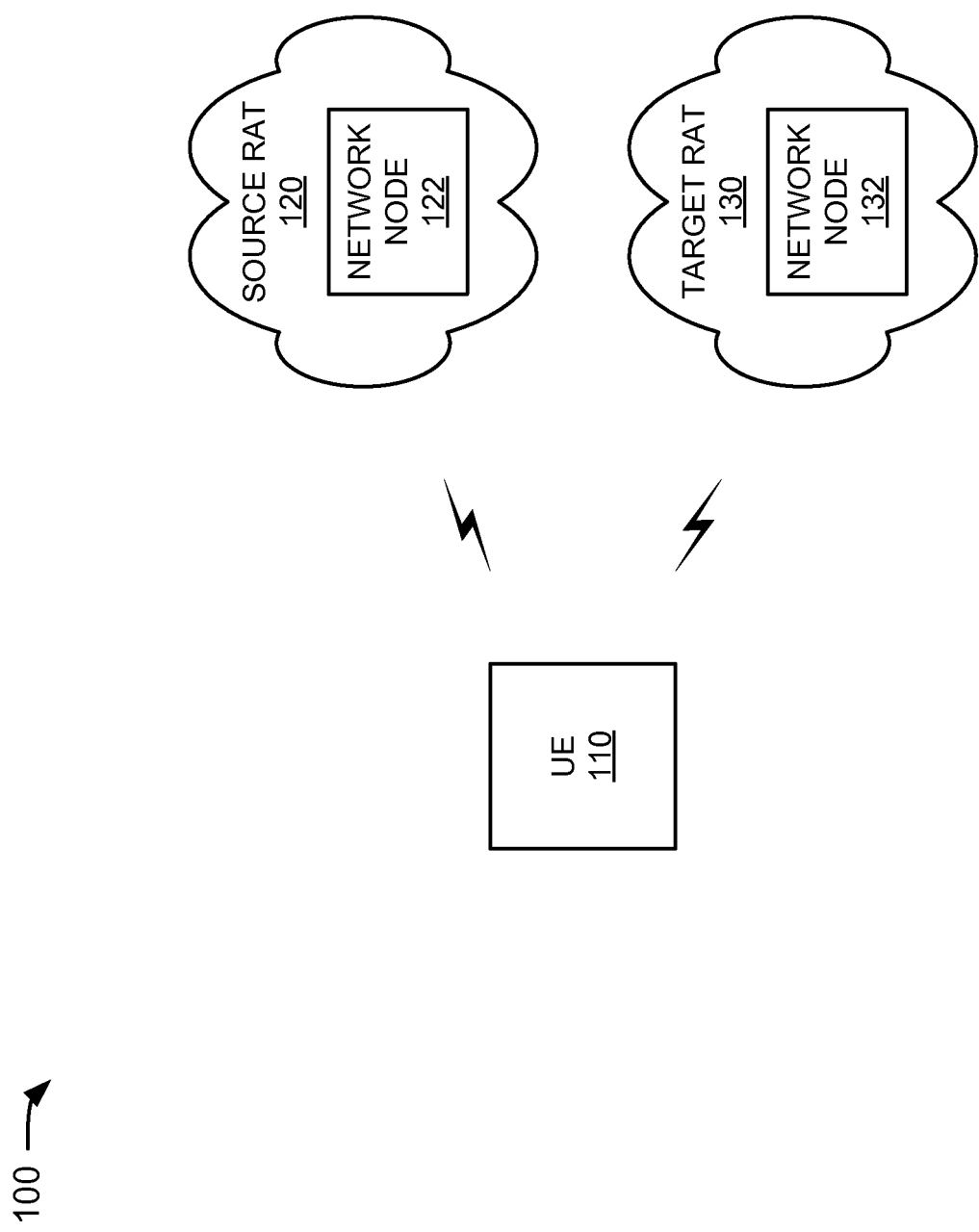
FIG. 1 is a diagram of an example network in which systems and/or methods described herein may be implemented.

FIG. 1 is a diagram of an example network 100 in which systems and/or methods described herein may be implemented. As shown, network 100 may include a UE 110, a source RAT 120 that includes a network node 122, and target RAT 130 that includes a network node 132. A single UE 110, a single source RAT 120, a single target RAT 130, and two network nodes 122/132 have been illustrated in FIG. 1 for simplicity. In practice, there may be more UEs 110, source RATs 120, network nodes 122, target RATs 130, and/or network nodes 132. Also, in some instances, one or more of the components of network 100 may perform one or more functions described as being performed by another one or more of the components of network 100.

UE 110 may include one or more computation and/or communication devices capable of sending/receiving voice and/or data to/from other UEs and/or network nodes 122/132. UE 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, etc.

Source RAT 120 may be part of a mobile telecommunication system (e.g., network 100) and may implement a particular radio access technology. Source RAT 120 may include a collection of network nodes (e.g., network node 122), such as radio network controllers (RNCs) and base stations (also referred to as NodeBs or eNodeBs). Source RAT 120 may carry many traffic types, from real-time circuit switched traffic to Internet protocol (IP)-based packet switched traffic. Source RAT 120 may permit connectivity between UE 110 and a core network (not shown). In one embodiment, source RAT 120 may implement a radio access technology (e.g., LTE) that is different than a radio access technology implemented by target RAT 130. In one example, UE 110 may initially be connected to source RAT 120, but may perform an IRAT handover to target RAT 130.

Network node 122 may include one or more devices that receive voice and/or data from a core network (not shown) and transmit that voice and/or data to UE 110 via an air interface. Network node 122 may also include one or more devices that receive voice and/or data from UE 110 over an air interface and transmit that voice and/or data to other UEs 110, other network nodes of source RAT 120, and/or the core network. In one embodiment, network node 122 may form one or more cells (e.g., in network 100) that may provide service to one or more UEs 110. In one example, network node 122 may correspond to a RNC. The RNC may act as a controlling radio network controller (CRNC), a drift radio network controller (DRNC), or a serving radio network controller (SRNC). A CRNC may be responsible for controlling the resources of a base station. On the other hand, an SRNC may serve particular UEs 110 and may manage connections towards those UEs 110. Likewise, a DRNC may fulfill a similar role to the SRNC (e.g., may route traffic between a SRNC and a particular UE 110). In another example, network node 122 may correspond to or include a base station.

Target RAT 130 may be part of a mobile telecommunication system (e.g., network 100) and may implement a particular radio access technology. Target RAT 130 may include a collection of network nodes (e.g., network node 132), such as RNCs and base stations. Target RAT 130 may carry many traffic types, from real-time circuit switched traffic to IP-based packet switched traffic. Target RAT 130 may permit connectivity between UE 110 and a core network (not shown). In one embodiment, target RAT 130 may implement a radio access technology (e.g., WCDMA) that is different than a radio access technology implemented by source RAT 120.

Network node 132 may include one or more devices that receive voice and/or data from a core network (not shown) and transmit that voice and/or data to UE 110 via an air interface. Network node 132 may also include one or more devices that receive voice and/or data from UE 110 over an air interface and transmit that voice and/or data to other UEs 110, other network nodes of target RAT 130, and/or the core network. In one embodiment, network node 132 may form one or more cells (e.g., in network 100) that may provide service to one or more UEs 110. In one example, network node 132 may correspond to a RNC. The RNC may act as a CRNC, a DRNC, or a SRNC. In another example, network node 132 may correspond to a base station.

Although FIG. 1 shows example components of network 100, in other embodiments, network 100 may include fewer components, different components, differently arranged components, or additional components than depicted in FIG. 1. For example, network 100 may include many RATs, but UE 110 may move between a single source RAT 120 and a single target RAT 130.

Figure 2:
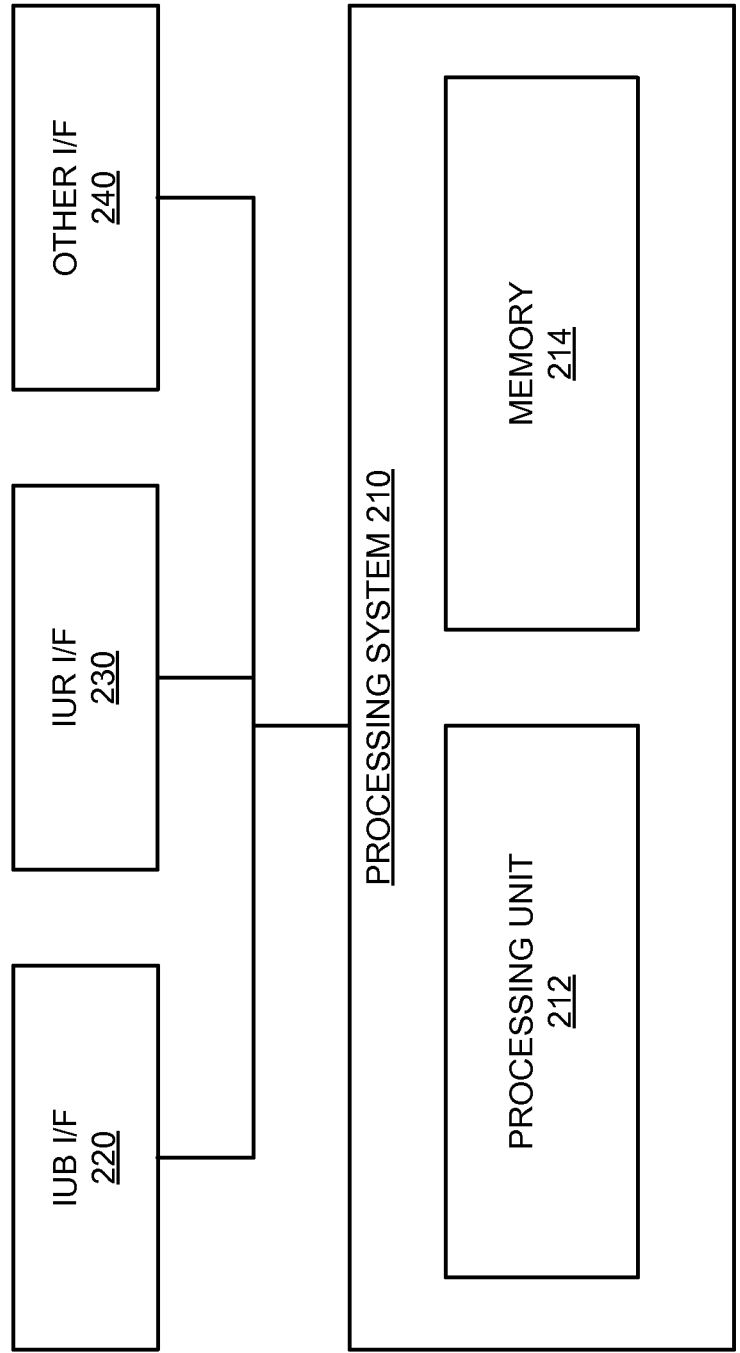
FIG. 2 is a diagram of example components of a network node shown in FIG. 1.

FIG. 2 is a diagram of example components of a network node (e.g., network node 122 or 132) when network node 122/132 corresponds to a RNC. As shown in FIG. 2, network node 122/132 may include a processing system 210, an Iub interface 220, an Iur interface 230, and/or other interfaces 240.

Processing system 210 may control the operation of network node 122/132. As illustrated, processing system 210 may include a processing unit 212 and a memory 214. Processing unit 212 may handle protocol exchanges between Iub interface 220, Iur interface 230, and other interfaces 240. In addition, processing unit 212 may generate control messages and/or data messages and transmit those control messages and/or data messages via interfaces 220-240. Processing unit 212 may also process control messages and/or data messages received from interfaces 220-240. In one embodiment, processing unit 212 may include one or more processors, microprocessors, application specific integrated circuits (ASICs), field programmable gate arrays (FPGAs), or the like. Memory 214 may include a random access memory (RAM), a read-only memory (ROM), and/or another type of memory to store data and instructions that may be used by processing unit 212.

Iub interface 220 may include one or more line cards that allow network node 122/132 to transmit control messages and/or data messages to and receive control messages and/or data messages from base stations. Iur interface 230 may include one or more line cards that allow network node 122/132 to transmit control messages and/or data messages to and receive control messages and/or data messages from other RNCs. Other interfaces 240 may include interfaces to other devices and/or networks. For example, other interfaces 240 may include an Iu-cs interface, which is a core network interface to a circuit-switched voice network, and an Iu-ps interface, which is a core network interface to a packet-switched data network.

As described herein, network node 122/132 may perform certain operations in response to processing unit 212 executing software instructions of an application contained in a computer-readable medium, such as memory 214. A computer-readable medium may be defined as a physical or logical memory device. A logical memory device may include memory space within a single physical memory device or spread across multiple physical memory devices. The software instructions may be read into memory 214 from another computer-readable medium or from another device. The software instructions contained in memory 214 may cause processing unit 212 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows example components of network node 122/132, in other embodiments, network node 122/132 may contain fewer components, different components, differently arranged components, or additional components than depicted in FIG. 2. Additionally or alternatively, one or more components of network node 122/132 may perform one or more other tasks described as being performed by one or more other components of network node 122/132.

Figure 3:
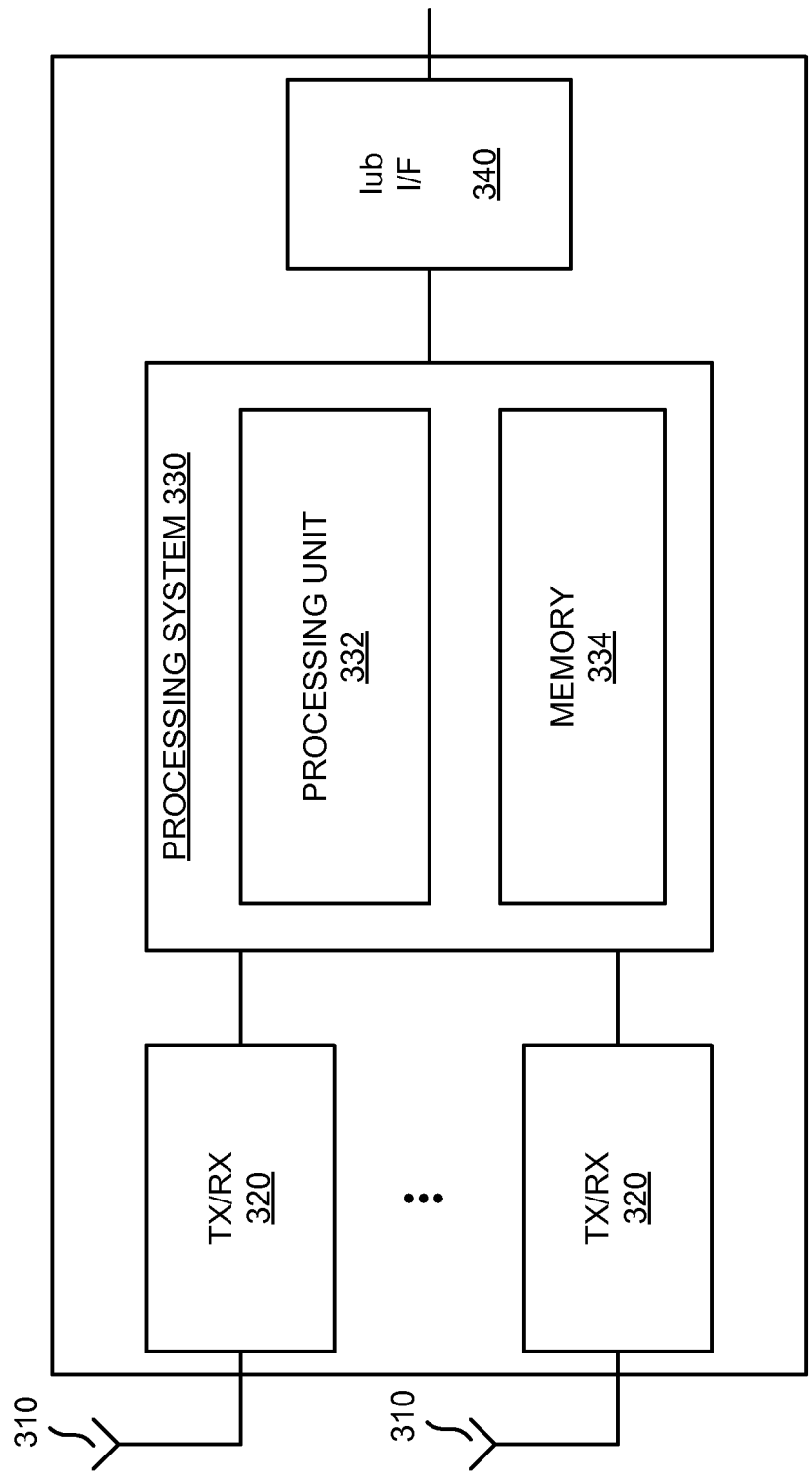
FIG. 3 is a diagram of alternative example components of a network node shown in FIG. 1.

FIG. 3 is a diagram of example components of a network node (e.g., network node 122 or 132) when network node 122/132 corresponds to a base station. As shown in FIG. 3, network node 122/132 may include antennas 310, transceivers (TX/RX) 320, a processing system 330, and an Iub interface (I/F) 340.

Antennas 310 may include one or more directional and/or omni-directional antennas. Transceivers 320 may be associated with antennas 310 and may include transceiver circuitry for transmitting and/or receiving symbol sequences in a network, such as network 100, via antennas 310.

Processing system 330 may control the operation of network node 122/132. Processing system 330 may also process information received via transceivers 320 and Iub interface 340. Processing system 330 may further measure quality and strength of a connection, may determine the distance to UEs 110, and may transmit this information to other network nodes. As illustrated, processing system 330 may include a processing unit 332 and a memory 334.

Processing unit 332 may include one or more processors, microprocessors, ASICs, FPGAs, or the like. Processing unit 332 may process information received via transceivers 320 and Iub interface 340. The processing may include, for example, data conversion, forward error correction (FEC), rate adaptation, WCDMA spreading/dispreading, quadrature phase shift keying (QPSK) modulation, etc. In addition, processing unit 332 may transmit control messages and/or data messages, and may cause those control messages and/or data messages to be transmitted via transceivers 320 and/or Iub interface 340. Processing unit 332 may also process control messages and/or data messages received from transceivers 320 and/or Iub interface 340.

Memory 334 may include a RAM, a ROM, and/or another type of memory to store data and instructions that may be used by processing unit 332.

Iub interface 340 may include one or more line cards that allow network node 122/132 to transmit data to and receive data from other devices in network 100.

As described herein, network node 122/132 may perform certain operations in response to processing unit 332 executing software instructions of an application contained in a computer-readable medium, such as memory 334. The software instructions may be read into memory 334 from another computer-readable medium or from another device via antennas 310 and transceivers 320. The software instructions contained in memory 334 may cause processing unit 332 to perform processes described herein. Alternatively, hardwired circuitry may be used in place of or in combination with software instructions to implement processes described herein. Thus, embodiments described herein are not limited to any specific combination of hardware circuitry and software.

Although FIG. 3 shows example components of network node 122/132, in other embodiments, network node 122/132 may contain fewer components, different components, differently arranged components, or additional components than depicted in FIG. 3. Additionally or alternatively, one or more components of network node 122/132 may perform one or more other tasks described as being performed by one or more other components of network node 122/132.

Figure 4:
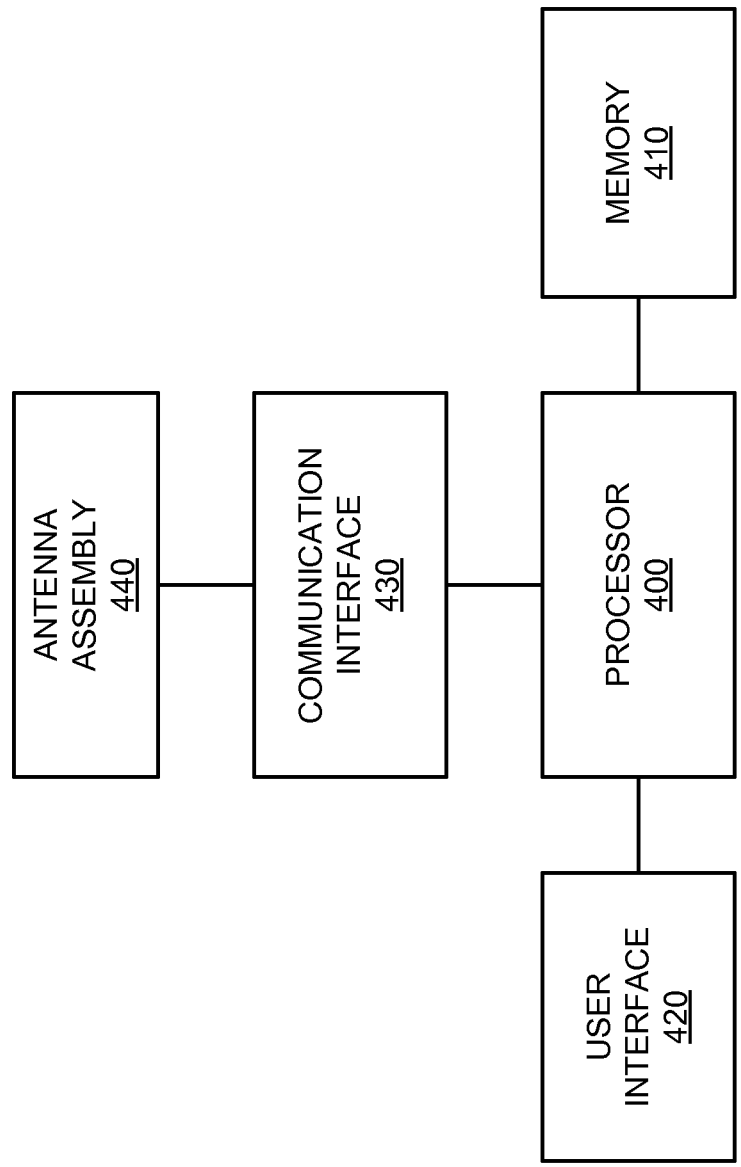
FIG. 4 is a diagram of example components of a user equipment depicted in FIG. 1.

FIG. 4 is a diagram of example components of UE 110. As shown, UE 110 may include a processor 400, a memory 410, a user interface 420, a communication interface 430, and an antenna assembly 440.

Processor 400 may include one or more microprocessors, ASICs, FPGAs, or the like. Processor 200 may control operation of UE 110 and its components. In one embodiment, processor 200 may control operation of components of UE 110 in a manner described herein.

Memory 410 may include a RAM, a ROM, and/or another type of memory to store data and instructions that may be used by processor 400.

User interface 420 may include mechanisms for inputting information to UE 110 and/or for outputting information from UE 110. Examples of input and output mechanisms might include buttons (e.g., control buttons, keys of a keypad, a joystick, etc.) or a touch screen interface to permit data and control commands to be input into UE 110; a speaker to receive electrical signals and output audio signals; a microphone to receive audio signals and output electrical signals; a display to output visual information (e.g., text input into UE 110); a vibrator to cause UE 110 to vibrate; etc.

Communication interface 430 may include, for example, a transmitter that may convert baseband signals from processor 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one embodiment, for example, communication interface 430 may communicate with a network and/or devices connected to a network.

As will be described in detail below, UE 110 may perform certain operations described herein in response to processor 400 executing software instructions of an application contained in a computer-readable medium, such as memory 410. The software instructions may be read into memory 410 from another computer-readable medium or from another device via communication interface 430. The software instructions contained in memory 410 may cause processor 400 to perform processes described herein. Alternatively, hardwired circuitry may be used in place of or in combination with software instructions to implement processes described herein. Thus, embodiments described herein are not limited to any specific combination of hardware circuitry and software.

Although FIG. 4 shows example components of UE 110, in other embodiments, UE 110 may contain fewer components, different components, differently arranged components, or additional components than depicted in FIG. 4. Additionally or alternatively, one or more components of UE 110 may perform one or more other tasks described as being performed by one or more other components of UE 110.

Figure 5:
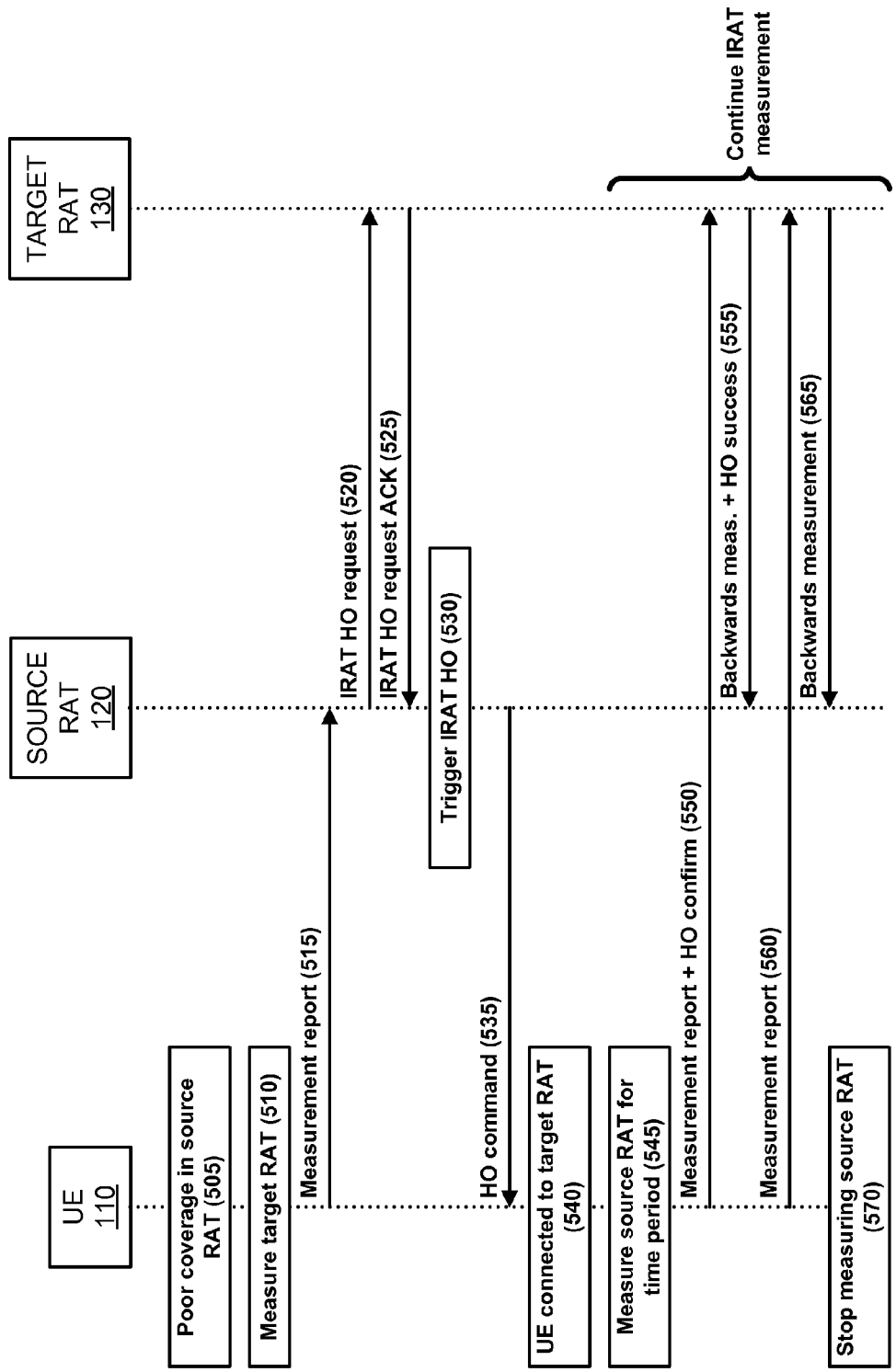
FIG. 5 is a diagram of example interactions among components of an example portion of the network depicted in FIG. 1.

FIG. 5 is a diagram of example interactions among components of an example portion 500 of network 100. As shown, example network portion 500 may include UE 110, source RAT 120, and target RAT 130. UE 110, source RAT 120, and/or target RAT 130 may include the features described above in connection with one or more of FIGS. 1-4. In one example, source RAT 120 may correspond to network node 122 and target RAT 130 may correspond to network node 132. In one embodiment, FIG. 5 may depict a first mechanism for detecting whether an IRAT handover (e.g., from source RAT 120 to target RAT 130) was triggered too early. The first mechanism may include UE 110 performing a backward measurement of source RAT 120 for a period of time after UE 110 is connected to target RAT 130.

As further shown in FIG. 5, UE 110 may initially be connected to source RAT 120 and may detect poor coverage in source RAT 120, as indicated by reference number 505. UE 110 may begin searching (e.g., via measurements) for a target RAT with better coverage than source RAT 120, as indicated by reference number 510, and may identify target RAT 130 based on the measurements. UE 110 may provide a measurement report (e.g., identifying target RAT 130 as a RAT with better coverage than source RAT 120) to source RAT 120, as indicted by reference number 515. Source RAT 120 may receive the measurement report and may generate an IRAT handover request (e.g., requesting handover of UE 110 to target RAT 130) based on the measurement report. Source RAT 120 may provide the IRAT handover request to target RAT 130, as indicated by reference number 520, and may receive (e.g., based on the IRAT handover request) an IRAT handover request acknowledgment from target RAT 130, as indicated by reference number 525.

Based on the IRAT handover request acknowledgment, source RAT 120 may trigger an IRAT handover of UE 110 (e.g., to target RAT 130), as indicated by reference number 530, and may provide an IRAT handover command to UE 110, as indicated by reference number 535. Based on the IRAT handover command, UE 110 may connect to target RAT 130, as indicated by reference number 540. UE 110 may measure coverage associated with source RAT 120 for a period of time (e.g., which may be defined by a network administrator) after UE 110 is connected to target RAT 130, as indicated by reference number 545.

As further shown in FIG. 5, UE 110 may provide a measurement report to target RAT 130, as indicated by reference number 550. The measurement report may be provided (e.g., by UE 110 to target RAT 130) together with a handover confirm message, as further indicated by reference number 550. Target RAT 130 may receive the measurement report and may forward the measurement report to source RAT 120 (e.g., along with handover success message), as indicated by reference number 555. UE 110 may continue (e.g., for the period of time) to provide one or more additional measurement reports to target RAT 130, as indicated by reference number 560, and target RAT 130 may forward the one of more additional measurement reports to source RAT 120, as indicated by reference number 565. After the period of time expires, UE 110 may stop measuring and/or reporting about the coverage associated with source RAT 120, as indicated by reference number 570. In one example, UE 110 may stop measuring and/or reporting (e.g., before the time period expires) if no signal is received from source RAT 120.

Source RAT 120 may receive the one or more measurement reports, and may compare the measurement report(s) to one or both of strength/quality (e.g., a signal strength and/or a signal quality) thresholds. If the measured signal strength and/or signal quality of source RAT 120 (e.g., as provided by the measurement report(s)) satisfies the strength/quality thresholds after IRAT handover of UE 110 to target RAT 130, source RAT 120 may determine that the IRAT handover was performed too early. Based on this determination, IRAT handover parameters may be automatically or manually tuned to minimize the number of handovers triggered too early, which may result in a more efficient cell configuration.

Although FIG. 5 shows example components of network portion 500, in other embodiments, network portion 500 may contain fewer components, different components, differently arranged components, or additional components than depicted in FIG. 5. Additionally or alternatively, one or more components of network portion 500 may perform one or more other tasks described as being performed by one or more other components of network portion 500.

Figure 6:
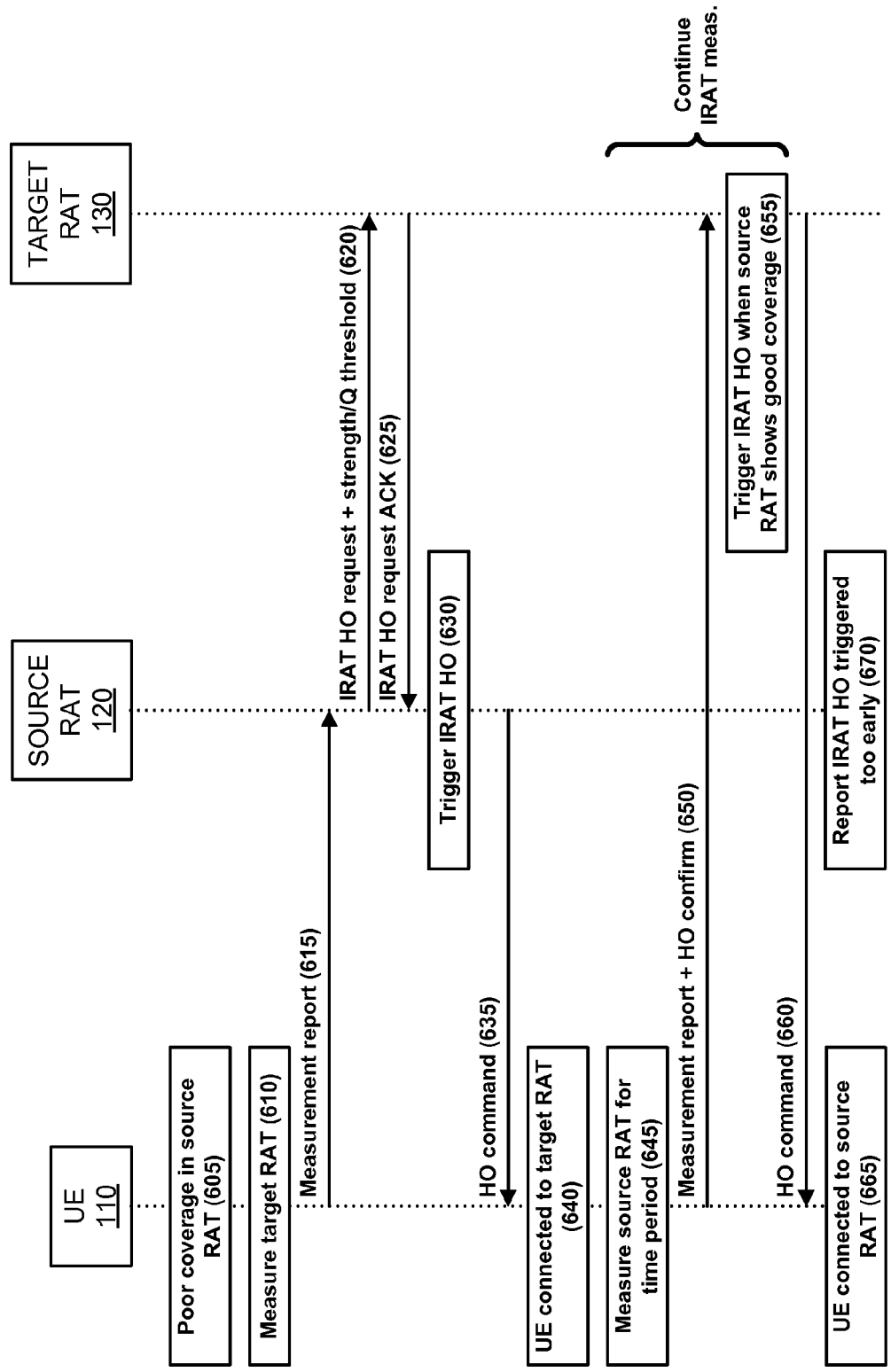
FIG. 6 is a diagram of further example interactions among components of an example portion of the network depicted in FIG. 1.

FIG. 6 is a diagram of further example interactions among components of an example portion 600 of network 100. As shown, example network portion 600 may include UE 110, source RAT 120, and target RAT 130. UE 110, source RAT 120, and/or target RAT 130 may include the features described above in connection with one or more of FIGS. 1-4. In one example, source RAT 120 may correspond to network node 122 and target RAT 130 may correspond to network node 132. In one embodiment, FIG. 6 may depict a second mechanism for detecting whether an IRAT handover (e.g., from source RAT 120 to target RAT 130) was triggered too early. The second mechanism may include UE 110 performing a backward measurement of source RAT 120 for a period of time after UE 110 is connected to target RAT 130, and target RAT 130 triggering an IRAT handover back to source RAT 120.

As further shown in FIG. 6, UE 110 may initially be connected to source RAT 120 and may detect poor coverage in source RAT 120, as indicated by reference number 605. UE 110 may begin searching (e.g., via measurements) for a target RAT with better coverage than source RAT 120, as indicated by reference number 610, and may identify target RAT 130 based on the measurements. UE 110 may provide a measurement report (e.g., identifying target RAT 130 as a RAT with better coverage than source RAT 120) to source RAT 120, as indicted by reference number 615. Source RAT 120 may receive the measurement report and may generate an IRAT handover request (e.g., requesting handover of UE 110 to target RAT 130) based on the measurement report. Source RAT 120 may provide the IRAT handover request to target RAT 130, as indicated by reference number 620. The IRAT handover request may include one or both of strength/quality thresholds (e.g., signal strength and/or signal quality thresholds) for source RAT 120. In one example, one or both of the strength/quality thresholds may be sent in a message that is separate from the IRAT handover request. In another example, one or both of the strength/quality threshold(s) may not be sent for every IRAT handover and may be stored in target RAT 130. The strength/quality thresholds may provide, for example, a minimum threshold on the signal strength and/or signal quality received from source RAT 120 (e.g., by UE 110). Source RAT 120 may receive (e.g., based on the IRAT handover request) an IRAT handover request acknowledgment from target RAT 130, as indicated by reference number 625.

Based on the IRAT handover request acknowledgment, source RAT 120 may trigger an IRAT handover of UE 110 (e.g., to target RAT 130), as indicated by reference number 630, and may provide an IRAT handover command to UE 110, as indicated by reference number 635. Based on the IRAT handover command, UE 110 may connect to target RAT 130, as indicated by reference number 640.

In one embodiment, and as further shown in FIG. 6, UE 110 may measure coverage associated with source RAT 120 for a period of time (e.g., which may be defined by a network administrator) after UE 110 is connected to target RAT 130, as indicated by reference number 645. UE 110 may provide a measurement report (e.g., based on the measurements) to target RAT 130, as indicated by reference number 650. The measurement report may be provided (e.g., by UE 110 to target RAT 130) together with a handover confirm message, as further indicated by reference number 650. UE 110 may continue (e.g., for the period of time) to provide one or more additional measurement reports to target RAT 130.

Target RAT 130 may receive the one or more measurement reports, and may compare the measurement report(s) to one or both of the strength/quality (e.g., a signal strength and/or a signal quality) thresholds received from source RAT 120. If the measured signal strength and/or signal quality of source RAT 120 (e.g., as provided by the measurement report(s)) satisfies the strength/quality thresholds after IRAT handover of UE 110 to target RAT 130, target RAT 130 may determine that the IRAT handover was performed too early. Based on this determination, target RAT 130 may trigger IRAT handover of UE 110 back to source RAT 120, as indicated by reference number 655. In one embodiment, IRAT handover of UE 110 back to source RAT 120 (e.g., to the same or a different network node of source RAT 120) may be triggered independently of a strength/quality level of target RAT 130. Target RAT 130 (e.g., after sending a handover request and receiving an acknowledgement from source RAT 120) may provide a handover command to UE 110, as indicated by reference number 660, and UE 110 may stop measuring and/or reporting about the coverage associated with source RAT 120 (e.g., after expiration of the time period). UE 110 may then connect to source RAT 120 (e.g., based on the handover command), as indicated by reference number 665. The receiving network node of source RAT 120 may inform a network node in source RAT 120 (e.g., responsible for statistic collection and optimization) that an IRAT handover was triggered too early, as indicated by reference number 670. IRAT handover parameters, associated with source RAT 120, may be automatically or manually tuned to minimize the number of handovers triggered too early, which may result in a more efficient cell configuration.

In an alternative embodiment, after successful IRAT handover and continued IRAT measurements, target RAT 130 may perform an analysis of the measurement report(s). If a signal/quality measurement of source RAT 120 satisfies one or both of the strength/quality thresholds (e.g., provided as indicated by reference number 620), target RAT 130 may trigger an IRAT handover back to source RAT 120. Alternatively, if the strength/quality thresholds are not provided to target RAT 130 (e.g., as indicated by reference number 620), target RAT 130 may use a general threshold on received signal strength/quality for IRAT handover from target RAT 130 back to source RAT 120. Target RAT 130 may provide a handover command to UE 110, and UE 110 may connect to source RAT 120 (e.g., based on the handover command). In one example, UE 110 may be returned back to source RAT 120 independently of whether a strength/quality measurement associated with target RAT 130 is above or below a general threshold to start IRAT measurement. In another example, the early handover from source RAT 120 to target RAT 130 may be detected (e.g., by source RAT 120) using statistics based on a ratio of returned UEs 110 in source RAT 120.

Although FIG. 6 shows example components of network portion 600, in other embodiments, network portion 600 may contain fewer components, different components, differently arranged components, or additional components than depicted in FIG. 6. Additionally or alternatively, one or more components of network portion 600 may perform one or more other tasks described as being performed by one or more other components of network portion 600. For example, in order to reduce a number of messages sent from target RAT 130 to source RAT 120, measurements may collected and statistically processed in target RAT 130 rather than sent to source RAT 120 for collection and statistical processing.

Figure 7:
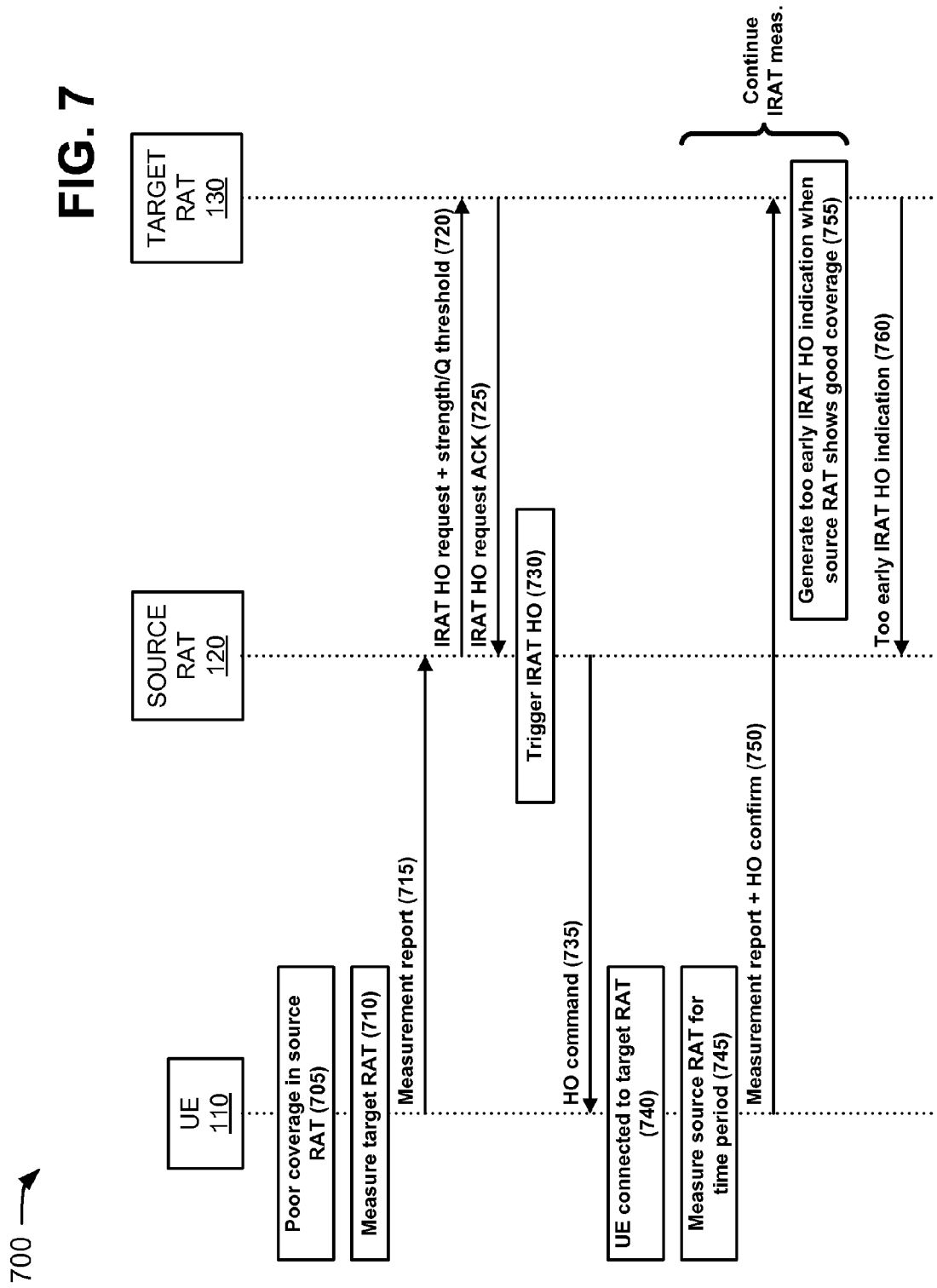
FIG. 7 is a diagram of additional example interactions among components of an example portion of the network depicted in FIG. 1.

FIG. 7 is a diagram of additional example interactions among components of an example portion 700 of network 100. As shown, example network portion 700 may include UE 110, source RAT 120, and target RAT 130. UE 110, source RAT 120, and/or target RAT 130 may include the features described above in connection with one or more of FIGS. 1-4. In one example, source RAT 120 may correspond to network node 122 and target RAT 130 may correspond to network node 132. In one embodiment, FIG. 7 may depict a third mechanism for detecting whether an IRAT handover (e.g., from source RAT 120 to target RAT 130) was triggered too early. The third mechanism may include UE 110 performing a backward measurement of source RAT 120 for a period of time after UE 110 is connected to target RAT 130, and target RAT 130 detecting and reporting the too early IRAT handover.

As further shown in FIG. 7, UE 110 may initially be connected to source RAT 120 and may detect poor coverage in source RAT 120, as indicated by reference number 705. UE 110 may begin searching (e.g., via measurements) for a target RAT with better coverage than source RAT 120, as indicated by reference number 710, and may identify target RAT 130 based on the measurements. UE 110 may provide a measurement report (e.g., identifying target RAT 130 as a RAT with better coverage than source RAT 120) to source RAT 120, as indicted by reference number 715. Source RAT 120 may receive the measurement report and may generate an IRAT handover request (e.g., requesting handover of UE 110 to target RAT 130) based on the measurement report. Source RAT 120 may provide the IRAT handover request to target RAT 130, as indicated by reference number 720. The IRAT handover request may include one or both of strength/quality thresholds (e.g., a signal strength and/or a signal quality threshold) for source RAT 120. As indicated above, the strength/quality thresholds may provide, for example, a minimum threshold on the signal strength and/or signal quality received from source RAT 120 (e.g., by UE 110). Source RAT 120 may receive (e.g., based on the IRAT handover request) an IRAT handover request acknowledgment from target RAT 130, as indicated by reference number 725.

Based on the IRAT handover request acknowledgment, source RAT 120 may trigger an IRAT handover of UE 110 (e.g., to target RAT 130), as indicated by reference number 730, and may provide an IRAT handover command to UE 110, as indicated by reference number 735. Based on the IRAT handover command, UE 110 may connect to target RAT 130, as indicated by reference number 740.

In one embodiment, and as further shown in FIG. 7, UE 110 may measure coverage associated with source RAT 120 for a period of time (e.g., which may be defined by a network administrator) after UE 110 is connected to target RAT 130, as indicated by reference number 745. UE 110 may provide a measurement report (e.g., based on the measurements) to target RAT 130, as indicated by reference number 750. The measurement report may be provided (e.g., by UE 110 to target RAT 130) together with a handover confirm message, as further indicated by reference number 750. UE 110 may continue (e.g., for the period of time) to provide one or more additional measurement reports to target RAT 130.

Target RAT 130 may receive the one or more measurement reports, and may compare the measurement report(s) to one or both of the strength/quality (e.g., a signal strength and/or a signal quality) thresholds received from source RAT 120. If the measured signal strength and/or signal quality of source RAT 120 (e.g., as provided by the measurement report(s)) satisfies one or both of the strength/quality thresholds after IRAT handover of UE 110 to target RAT 130, target RAT 130 may determine that the IRAT handover was performed too early. Based on this determination, target RAT 130 may generate a too early IRAT handover indication, as indicated by reference number 755, and may provide the too early IRAT handover indication to source RAT 120, as indicated by reference number 760. UE 110 may stop measuring and reporting coverage associated with source RAT 120 (e.g., after expiration of the time period). Based on the too early IRAT handover indication, IRAT handover parameters in source RAT 120 may be automatically or manually tuned to minimize the number of handovers triggered too early, which may result in a more efficient cell configuration.

In an alternative embodiment, after successful IRAT handover and continued IRAT measurements, target RAT 130 may perform an analysis of the measurement report(s). If a signal/quality measurement of source RAT 120 satisfies one or both the strength/quality thresholds (e.g., provided as indicated by reference number 720), target RAT 130 may inform source RAT 120 that the triggered IRAT handover was triggered too early (e.g., via a message sent by a transport network). Alternatively, if the strength/quality thresholds are not provided to target RAT 130 (e.g., as indicated by reference number 720) target RAT 130 may use a general threshold on received signal strength/quality for IRAT handover from target RAT 130 back to source RAT 120. In one example, the early handover from source RAT 120 to target RAT 130 may be detected (e.g., by source RAT 120) using statistics based on a ratio of received too early handover messages from target RAT 130.

Although FIG. 7 shows example components of network portion 700, in other embodiments, network portion 700 may contain fewer components, different components, differently arranged components, or additional components than depicted in FIG. 7. Additionally or alternatively, one or more components of network portion 700 may perform one or more other tasks described as being performed by one or more other components of network portion 700. For example, in order to reduce a number of messages sent from target RAT 130 to source RAT 120, measurements may collected and statistically processed in target RAT 130 rather than sent to source RAT 120 for collection and statistical processing.

The three mechanisms described above in connection with FIGS. 5-7 may provide reliable information to source RAT 120 as to whether an IRAT handover decision was correctly made or made too early. The first mechanism (FIG. 5) may provide such reliable information by sending a message (e.g., via a transport or core network) containing information about a status of measurements after handover. The second mechanism (FIG. 6) may provide such reliable information in a similar manner, but may also command UE 110 to return to source RAT 120. Source RAT 120 may interpret the return of UE 110 (e.g., to source RAT 120) as an indication of a too early IRAT handover. Since the return IRAT handover of UE 110 can be provided to a same or a different network node as the original network node (e.g., of source RAT 120), additional inter-node communication may be performed in source RAT 120 in order to determine the too early IRAT handover. The third mechanism (FIG. 7) may follow a similar approach as the second mechanism, but instead of triggering the second IRAT handover (e.g., back to source RAT 120), target RAT 130 may send a too early handover indication to source RAT 120.

In all three mechanisms, by computing all or a known subset of IRAT handovers, source RAT 120 may calculate a too early IRAT handover (HO) ratio, for example, as follows:

$$\text{Early\_IRAT\_HO\_Ratio} = \frac{\text{Number\_Too\_Early\_IRAT\_HO}}{\text{Number\_Triggered\_IRAT\_HO}}.$$

The too early IRAT handover ratio may be calculated per source cell (e.g., of source RAT 120) or per cell relation. The too early IRAT handover ratio may provide a good indication of how many IRAT handover decisions are performed too early in source RAT 120, and may be used for automatic or manual optimization of a cell configuration.

Figure 8:
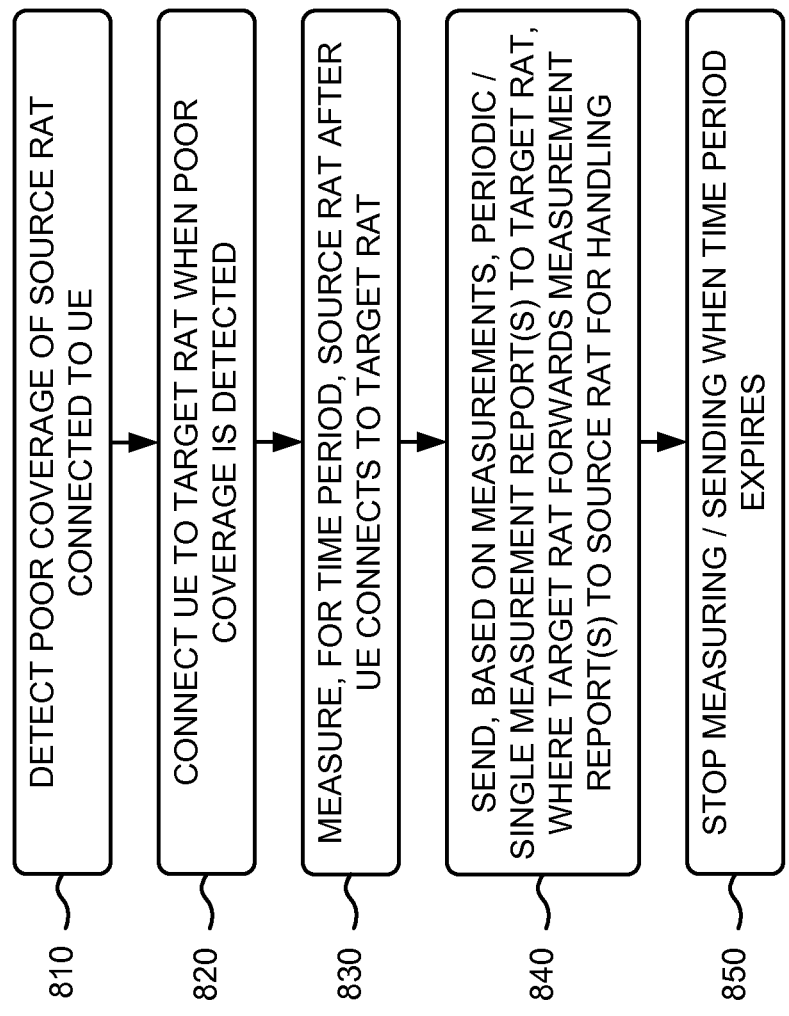
FIGS. 8 and 9 are flow charts of an example process for detecting too early IRAT handover triggering in a telecommunication system according to embodiments described herein.
Figure 9:
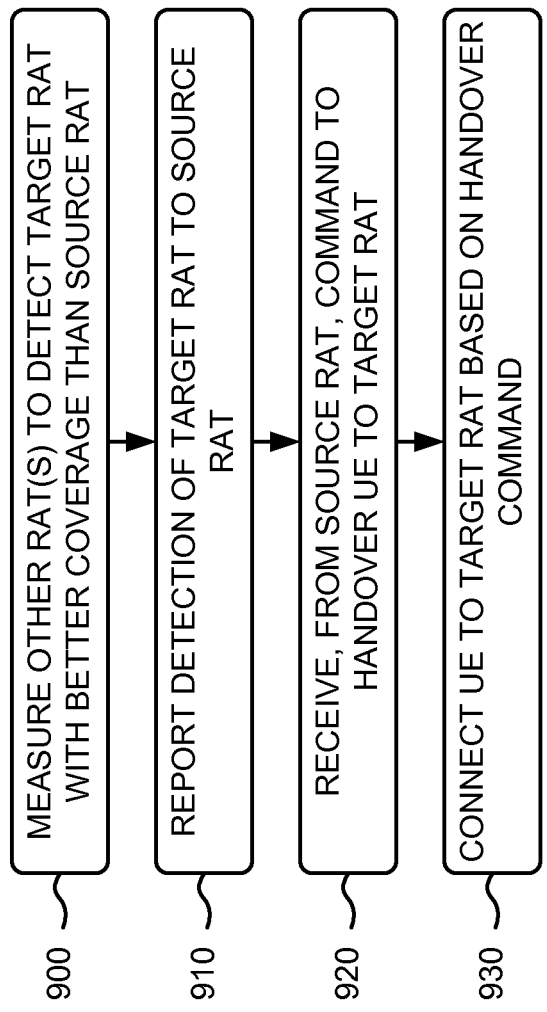

FIGS. 8 and 9 are flow charts of an example process 800 for detecting too early IRAT handover triggering in a telecommunication system according to embodiments described herein. In one embodiment, one or more steps of process 800 may be performed by UE 110. In other embodiments, some or all of process 800 may be performed by another device or group of devices (e.g., communicating with UE 110).

As illustrated in FIG. 8, process 800 may include detecting poor coverage of a source RAT connected to a UE (block 810), connecting the UE to a target RAT when poor coverage is detected (block 820), and measuring, for a time period, the source RAT after the UE connects to the target RAT (block 830). For example, in embodiments described above in connection with FIG. 5, UE 110 may initially be connected to source RAT 120 and may detect poor coverage in source RAT 120, as indicated by reference number 505. UE 110 may begin searching (e.g., via measurements) for a target RAT with better coverage than source RAT 120, as indicated by reference number 510, and may identify target RAT 130 based on the measurements. Source RAT 120 may receive a measurement report (e.g., identifying target RAT 130 as a RAT with better coverage than source RAT 120) and may generate an IRAT handover request (e.g., requesting handover of UE 110 to target RAT 130) based on the measurement report. Source RAT 120 may trigger an IRAT handover of UE 110 (e.g., to target RAT 130), as indicated by reference number 530, and may provide (e.g., after receiving an IRAT handover acknowledgement from target RAT 130) an IRAT handover command to UE 110, as indicated by reference number 535. Based on the IRAT handover command, UE 110 may connect to target RAT 130, as indicated by reference number 540. UE 110 may measure coverage associated with source RAT 120 for a period of time (e.g., which may be defined by a network administrator) after UE 110 is connected to target RAT 130, as indicated by reference number 545.

As further shown in FIG. 8, process 800 may include sending, based on the measurements, periodic measurement reports (or a single measurement report) to the target RAT, where the target RAT forwards the measurement report(s) to the source RAT for handling (block 840), and stopping the measuring and the sending when the time period expires (block 850). For example, in embodiments described above in connection with FIG. 5, UE 110 may provide a measurement report to target RAT 130, as indicated by reference number 550. The measurement report may be provided (e.g., by UE 110 to target RAT 130) together with a handover confirm message, as further indicated by reference number 550. Target RAT 130 may receive the measurement report and may forward the measurement report to source RAT 120 (e.g., along with handover success message), as indicated by reference number 555. UE 110 may continue (e.g., for the period of time) to provide one or more additional measurement reports to target RAT 130, as indicated by reference number 560, and target RAT 130 may forward the one of more additional measurement reports to source RAT 120, as indicated by reference number 565. After the period of time expires, UE 110 may stop measuring and/or reporting about the coverage associated with source RAT 120, as indicated by reference number 570.

Process block 820 may include the process blocks depicted in FIG. 9. As illustrated in FIG. 9, process block 820 may include measuring one or more other RATs to detect the target RAT with better coverage than the source RAT (block 900), reporting the detection of the target RAT to the source RAT (block 910), receiving, from the source RAT, a command to handover the UE to the target RAT (block 920), and connecting the UE to the target RAT based on the handover command (block 930). For example, in embodiments described above in connection with FIG. 5, UE 110 may begin searching (e.g., via measurements) for a target RAT with better coverage than source RAT 120, as indicated by reference number 510, and may identify target RAT 130 based on the measurements. UE 110 may provide a measurement report (e.g., identifying target RAT 130 as a RAT with better coverage than source RAT 120) to source RAT 120, as indicted by reference number 515. Source RAT 120 may receive the measurement report and may generate an IRAT handover request (e.g., requesting handover of UE 110 to target RAT 130) based on the measurement report. Source RAT 120 may trigger an IRAT handover of UE 110 (e.g., to target RAT 130), as indicated by reference number 530, and may provide (e.g., after receiving an IRAT handover acknowledgement from target RAT 130) an IRAT handover command to UE 110, as indicated by reference number 535. Based on the IRAT handover command, UE 110 may connect to target RAT 130, as indicated by reference number 540.

Figure 10:
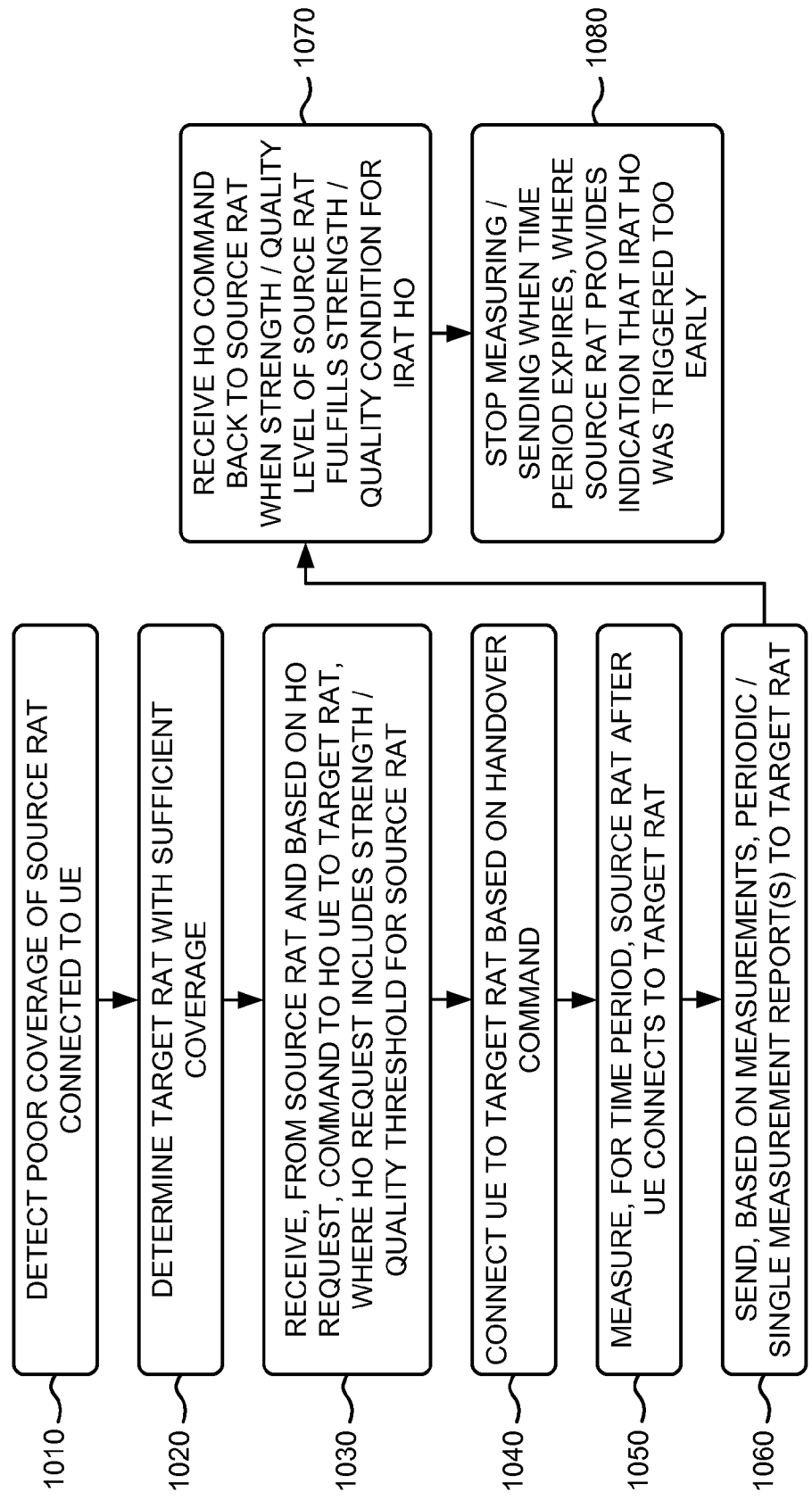
FIG. 10 is a flow chart of another example process for detecting too early IRAT handover triggering in a telecommunication system according to embodiments described herein.

FIG. 10 is a flow chart of another example process 1000 for detecting too early IRAT handover triggering in a telecommunication system according to embodiments described herein. In one embodiment, one or more steps of process 1000 may be performed by UE 110. In other embodiments, some or all of process 1000 may be performed by another device or group of devices (e.g., communicating with UE 110).

As illustrated in FIG. 10, process 1000 may include detecting poor coverage of a source RAT connected to a UE (block 1010), determining a target RAT with sufficient coverage (block 1020), and receiving, from the source RAT and based on a handover request, a command to handover the UE to a target RAT, where the handover request includes one or both of strength/quality thresholds for the source RAT (block 1030). For example, in embodiments described above in connection with FIG. 6, UE 110 may initially be connected to source RAT 120 and may detect poor coverage in source RAT 120, as indicated by reference number 605. UE 110 may begin searching (e.g., via measurements) for a target RAT with better coverage than source RAT 120, as indicated by reference number 610, and may identify target RAT 130 based on the measurements. Source RAT 120 may provide an IRAT handover request to target RAT 130, as indicated by reference number 620. The IRAT handover request may include one or both of strength/quality (e.g., a signal strength and/or a signal quality) thresholds for source RAT 120. Source RAT 120 may receive (e.g., based on the IRAT handover request) an IRAT handover request acknowledgment from target RAT 130, as indicated by reference number 625. Based on the IRAT handover request acknowledgment, source RAT 120 may trigger an IRAT handover of UE 110 (e.g., to target RAT 130), as indicated by reference number 630, and may provide an IRAT handover command to UE 110, as indicated by reference number 635.

As further shown in FIG. 10, process 1000 may include connecting the UE to the target RAT based on the handover command (block 1040), measuring, for a time period, the source RAT after the UE connects to the target RAT (block 1050), and sending, based on the measurements, periodic measurement reports (or a single measurement report) to the target RAT (block 1060). For example, in embodiments described above in connection with FIG. 6, based on the IRAT handover command, UE 110 may connect to target RAT 130, as indicated by reference number 640. UE 110 may measure coverage associated with source RAT 120 for a period of time (e.g., which may be defined by a network administrator) after UE 110 is connected to target RAT 130, as indicated by reference number 645. UE 110 may provide a measurement report (e.g., based on the measurements) to target RAT 130, as indicated by reference number 650. The measurement report may be provided (e.g., by UE 110 to target RAT 130) together with a handover confirm message, as further indicated by reference number 650. UE 110 may continue (e.g., for the period of time) to provide one or more additional measurement reports to target RAT 130.

Returning to FIG. 10, process 1000 may include receiving a handover command back to the source RAT when a strength/quality level of the source RAT fulfills one or both of strength/quality conditions (e.g., thresholds) for IRAT handover (block 1070), and stopping the measuring and the sending when the time period expires, (block 1080). For example, in embodiments described above in connection with FIG. 6, if the measured signal strength and/or signal quality of source RAT 120 (e.g., as provided by the measurement report(s)) satisfies the strength/quality thresholds after IRAT handover of UE 110 to target RAT 130, target RAT 130 may determine that the IRAT handover was performed too early. Based on this determination, target RAT 130 may trigger IRAT handover of UE 110 back to source RAT 120, as indicated by reference number 655. In one example, IRAT handover of UE 110 back to source RAT 120 (e.g., to the same or a different network node of source RAT 120) may be triggered independently of a strength/quality level of target RAT 130. Target RAT 130 may provide a handover command to UE 110, as indicated by reference number 660, and UE 110 may stop measuring and/or reporting about the coverage associated with source RAT 120. UE 110 may then connect to source RAT 120 (e.g., based on the handover command), as indicated by reference number 665. The receiving network node of source RAT 120 may inform a network node in source RAT 120 (e.g., responsible for statistic collection and optimization) that an IRAT handover was triggered too early, as indicated by reference number 670.

FIG. 11 is a flow chart of still another example process 1100 for detecting too early IRAT handover triggering in a telecommunication system according to embodiments described herein. In one embodiment, process 1100 may be performed by UE 110. In other embodiments, some or all of process 800 may be performed by another device or group of devices (e.g., communicating with UE 110).

As illustrated in FIG. 11, process 1100 may include detecting poor coverage of a source RAT connected to a UE (block 1110), determining a target RAT with sufficient coverage (block 1120), and receiving, from the source RAT and based on a handover request, a command to handover the UE to a target RAT, where the handover request includes one or both of strength/quality thresholds for the source RAT (block 1130). For example, in embodiments described above in connection with FIG. 7, UE 110 may initially be connected to source RAT 120 and may detect poor coverage in source RAT 120, as indicated by reference number 705. UE 110 may begin searching (e.g., via measurements) for a target RAT with better coverage than source RAT 120, as indicated by reference number 710, and may identify target RAT 130 based on the measurements. Source RAT 120 may provide an IRAT handover request to target RAT 130, as indicated by reference number 720. The IRAT handover request may include strength/quality (e.g., a signal strength and/or a signal quality) thresholds for source RAT 120. Source RAT 120 may receive (e.g., based on the IRAT handover request) an IRAT handover request acknowledgment from target RAT 130, as indicated by reference number 725. Based on the IRAT handover request acknowledgment, source RAT 120 may trigger an IRAT handover of UE 110 (e.g., to target RAT 130), as indicated by reference number 730, and may provide an IRAT handover command to UE 110, as indicated by reference number 735.

As further shown in FIG. 11, process 1100 may include connecting the UE to the target RAT based on the handover command (block 1140), measuring, for a time period, the source RAT after the UE connects to the target RAT (block 1150), and sending, based on the measurements, periodic measurement reports (or a single measurement report) to the target RAT (block 1160). For example, in embodiments described above in connection with FIG. 7, based on the IRAT handover command, UE 110 may connect to target RAT 130, as indicated by reference number 740. UE 110 may measure coverage associated with source RAT 120 for a period of time (e.g., which may be defined by a network administrator) after UE 110 is connected to target RAT 130, as indicated by reference number 745. UE 110 may provide a measurement report (e.g., based on the measurements) to target RAT 130, as indicated by reference number 750. The measurement report may be provided (e.g., by UE 110 to target RAT 130) together with a handover confirm message, as further indicated by reference number 750. UE 110 may continue (e.g., for the period of time) to provide one or more additional measurement reports to target RAT 130.

Returning to FIG. 11, process 1100 may include the target RAT providing a too early handover indication to the source RAT when a strength/quality level of the source RAT fulfills one or both of strength/quality conditions (e.g., thresholds) for IRAT handover (block 1170), and stopping the measuring and the sending when the time period expires (block 1180). For example, in embodiments described above in connection with FIG. 7, target RAT 130 may receive the one or more measurement reports, and may compare the measurement report(s) to one or both of strength/quality (e.g., a signal strength and/or a signal quality) thresholds. If the measured signal strength and/or signal quality of source RAT 120 (e.g., as provided by the measurement report(s)) satisfies the strength/quality thresholds after IRAT handover of UE 110 to target RAT 130, target RAT 130 may determine that the IRAT handover was performed too early. Based on this determination, target RAT 130 may generate a too early IRAT handover indication, as indicated by reference number 755, and may provide the too early IRAT handover indication to source RAT 120, as indicated by reference number 760. UE 110 may stop measuring and reporting signal strength and/or signal quality associated with source RAT 120.

Systems and/or methods described herein may provide mechanisms to detect too early IRAT handover triggering (e.g., which was previously undetectable) and to mitigate too early IRAT handover triggering in the future. The systems and/or methods may enable automatic or manual tuning of IRAT handover parameters of a source RAT to minimize the number of handovers triggered too early, which may result in a more efficient cell configuration. The systems and/or methods may instruct a UE (e.g., for which an IRAT handover, from a source RAT to a target RAT, was performed) to continue measuring the source RAT and the target RAT for a time period after the IRAT handover. The systems and/or methods may instruct the UE to send a measurement report (e.g., based on the measurements of the source and target RATs) to the target RAT after the time period expires. Upon reception of the measurement report, the target RAT may forward the measurement report to the source RAT. Alternatively, or additionally, the target RAT may trigger a second IRAT handover to the source RAT even if a poor coverage threshold (e.g., for triggering IRAT handover) is not satisfied.

The foregoing description of embodiments provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5-11, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method in a network that includes a user equipment, the method comprising:
   detecting, by the user equipment, poor coverage associated with a source radio access technology (RAT) with which the user equipment is connected;
   connecting the user equipment to a target RAT when the poor coverage is detected;
   measuring, by the user equipment, signal strength and/or signal quality of the source RAT for a time period after the user equipment connects to the target RAT;
   sending, by the user equipment and based on the measurements, one or more measurement reports to the target RAT based on the measured signal strength and/or signal quality;
   communicating information based on the one or more measurement reports of the user equipment from the target RAT to the source RAT; and
   determining, by the source RAT, based on the measured signal strength and/or signal quality of the source RAT indicated by the information received from the target RAT, whether a handover to the target RAT was triggered too early.

2. The method of claim 1, where the target RAT is capable of providing coverage for the user equipment.

3. The method of claim 1, where connecting the user equipment to a target RAT includes:
   measuring, by the user equipment, one or more other RATs to detect the target RAT with better coverage than the source RAT;
   reporting, by the user equipment and to the source RAT, detection of the target RAT;
   receiving, by the user equipment and from the source RAT, a command to handover the user equipment to the target RAT, where the handover command is associated with a handover request; and
   connecting the user equipment to the target RAT based on the handover command.

4. The method of claim 3, wherein the measurement reports are generated using a strength threshold and/or a quality threshold which is:
   provided from the source RAT to the target RAT in the handover request,
   provided to the target RAT in a message that is separate from the handover request,
   or received from earlier handovers and stored in the target RAT.

5. The method of claim 1, where one or both of strength/quality thresholds associated with the source RAT are one of:
   provided to the target RAT in a message, or
   received from earlier handovers and stored in the target RAT.

6. The method of claim 1, where the time period is one of preconfigured in the user equipment or provided to the user equipment, and where measuring the source RAT includes at least one of:
   measuring a signal strength associated with the source RAT for the time period after the user equipment connects to the target RAT; or
   measuring a signal quality associated with the source RAT for the time period after the user equipment connects to the target RAT.

7. The method of claim 6, further comprising:
   ceasing measurement, prior to the end of the time period, of at least one of the signal strength and/or the signal quality associated with the source RAT when no signal is received from the source RAT.

8. The method of claim 1, where the target RAT forwards the one or more measurement reports to the source RAT.

9. The method of claim 1, wherein the source RAT calculates a ratio of a number of determined too early inter-radio access technology (IRAT) handovers to a number of IRAT handovers to control cell configuration.

10. The method of claim 1, where:
    the target RAT forwards the one or more measurement reports to the source RAT, and the source RAT calculates a too early IRAT handover ratio based on the one or more measurement reports.

11. The method of claim 1, where the target RAT determines that a handover to the target RAT was triggered too early based on one or both of strength/quality thresholds associated with the source RAT and provides, to the source RAT and based on the determination, a too early inter-RAT (IRAT) handover indication.

12. The method of claim 11, where the source RAT calculates a too early IRAT handover ratio based on one or more too early IRAT handover indications.

13. The method of claim 1, where the target RAT determines that a handover to the target RAT was triggered too early based on one or both of strength/quality thresholds associated with the source RAT and commands the user equipment to return to the source RAT.

14. The method of claim 13, where the source RAT calculates a too early IRAT handover ratio based on a number of user equipment that return to the source RAT immediately after being transferred to the target RAT.

15. The method of claim 1, where the one or more measurement reports are used to determine whether the handover to the target RAT was triggered too early.

16. A method in a network that includes a user equipment connected to a source radio access technology (RAT), where the user equipment connects to a target RAT when poor coverage is detected in the source RAT, the method comprising:
    instructing the user equipment to measure at least one of a signal strength and/or a signal quality associated with the source RAT for a time period after the user equipment connects to the target RAT;

instructing the user equipment to send, based on the measurements, one or more measurement reports to the target RAT;

communicating information based on the one or more measurement reports of the user equipment from the target RAT to the source RAT;

determining, by the source RAT, based on the measured signal strength and/or signal quality of the source RAT indicated by the information received from the target RAT, whether an inter-radio access technology (IRAT) handover to the target RAT was triggered too early.

17. The method of claim 16, further comprising:
providing, to the user equipment, a command to handover the user equipment to the target RAT, where the handover command is associated with a handover request; and
connecting the user equipment to the target RAT based on the handover command.

18. The method of claim 17, wherein the measurement reports are generated using a strength threshold and/or a quality threshold which is:
provided from the source RAT to the target RAT in the handover request,
provided to the target RAT in a message that is separate from the handover request, or
received from earlier handovers and stored in the target RAT.

19. The method of claim 16, where one or both of strength/quality thresholds associated with the source RAT are one of:
provided to the target RAT in a message, or
received from earlier handovers and stored in the target RAT.

20. The method of claim 16, further comprising:
receiving the one or more measurement reports from the target RAT.

21. The method of claim 16, further comprising:
calculating a ratio of a number of determined too early inter-radio access technology (IRAT) handovers to a number of IRAT handovers to control cell configuration.

22. The method of claim 16, further comprising:
receiving, from the target RAT, the one or more measurement reports; and
calculating a too early IRAT handover ratio based on the one or more measurement reports.

23. The method of claim 16, where the source RAT does not determine that the IRAT handover to the target RAT was triggered too early, the target RAT determines that the IRAT handover to the target RAT was triggered too early based on one or both of strength/quality thresholds associated with the source RAT, and the method further comprises:
receiving, from the target RAT and based on the determination, a too early inter-RAT (IRAT) handover indication.

24. The method of claim 23, further comprising:
calculating a too early IRAT handover ratio based on one or more too early IRAT handover indications.

25. The method of claim 16, where the one or more measurement reports are used to determine whether the handover to the target RAT was triggered too early.

26. The method of claim 16, where the time period is one of preconfigured in the user equipment or provided to the user equipment.

27. The method of claim 16, where:
the source RAT does not determine that the IRAT handover to the target RAT was triggered too early,
the target RAT determines that the IRAT handover to the target RAT was triggered too early based on one or both of strength/quality thresholds associated with the source RAT, and
the target RAT commands the user equipment to return to the source RAT.

28. The method of claim 27, further comprising:
calculating a too early IRAT handover ratio based on a number of user equipment that return to the source RAT immediately after being transferred to the target RAT.

29. A method in a network that includes a user equipment connected to a source radio access technology (RAT), where the user equipment connects to a target RAT when poor coverage is detected in the source RAT, the method comprising:
instructing the user equipment to measure at least one of a signal strength and/or a signal quality associated with the source RAT for a time period after the user equipment connects to the target RAT;
receiving, by the target RAT and from the user equipment, one or more measurement reports generated based on the measurements;
communicating information based on the one or more measurement reports of the user equipment from the target RAT to the source RAT; and
determining, by the source RAT, based on the measured signal strength and/or signal quality of the source RAT indicated by the information received from the target RAT, whether a handover to the target RAT was triggered too early.

30. The method of claim 29, where the target RAT is capable of providing coverage for the user equipment.

31. The method of claim 29, where the user equipment receives, from the source RAT, a command to handover the user equipment to the target RAT, the handover command is associated with a handover request, and the method further comprises:
connecting the user equipment to the target RAT based on the handover command.

32. The method of claim 31, wherein the measurement reports are generated using a strength threshold and/or a quality threshold which is:
provided from the source RAT to the target RAT in the handover request,
provided to the target RAT in a message that is separate from the handover request, or
received from earlier handovers and stored in the target RAT.

33. The method of claim 29, where one or both of strength/quality thresholds associated with the source RAT are one of:
provided to the target RAT in a message, or
received from earlier handovers and stored in the target RAT.

34. The method of claim 29, further comprising:
forwarding the one or more measurement reports to the source RAT.

35. The method of claim 34, wherein the source RAT calculates a ratio of a number of determined too early inter-radio access technology (IRAT) handovers to a number of IRAT handovers to control cell configuration.

36. The method of claim 29, where the source RAT determines whether a handover to the target RAT was triggered too early based on at least one of the signal strength and/or the signal quality associated with the source RAT.

37. The method of claim 36, where the source RAT calculates a too early IRAT handover ratio based on at least one of the signal strength and/or the signal quality associated with the source RAT.

38. The method of claim 29, further comprising:
determining that a handover to the target RAT was triggered too early based on one or both of strength/quality thresholds associated with the source RAT; and
providing, to the source RAT and based on the determination, a too early inter-RAT (IRAT) handover indication.

39. The method of claim 29, further comprising:
determining that a handover to the target RAT was triggered too early based on one or both of strength/quality thresholds associated with the source RAT; and
commanding the user equipment to return to the source RAT.

40. The method of claim 39, where:
the source RAT calculates a too early IRAT handover ratio based on a number of user equipment that return to the source RAT immediately after being transferred to the target RAT.

41. The method of claim 29, where the time period is one of preconfigured in the user equipment or provided to the user equipment.

42. A device in a source radio access technology (RAT) connected to a user equipment, where the user equipment connects to a target RAT when poor coverage is detected in the source RAT, the device comprising:
a memory to store a plurality of instructions; and
a processor to execute instructions in the memory to:
instruct the user equipment to measure at least one of a signal strength and/or a signal quality associated with the source RAT for a time period after the user equipment connects to the target RAT,
instruct the user equipment to send, based on the measurements, one or more measurement reports to the target RAT,
receive, from the target RAT, information based on the one or more measurement reports, and
determine, based on the measured signal strength and/or signal quality associated with the source RAT indicated by the information received from the target RAT, whether an inter-radio access technology (IRAT) handover to the target RAT was triggered too early.

43. The device of claim 42, wherein the measurement reports are generated using a strength threshold and/or a quality threshold which is:
provided from the source RAT to the target RAT in the handover request,
provided to the target RAT in a message that is separate from the handover request, or
received from earlier handovers and stored in the target RAT.

44. The device of claim 42, where one or both of strength/quality thresholds associated with the source RAT are one of:
provided to the target RAT in a message, or
received from earlier handovers and stored in the target RAT.

45. A device in a target radio access technology (RAT) connected to a user equipment, where the user equipment connects to a target RAT when a problem occurs in a source RAT, the device comprising:
a memory to store a plurality of instructions; and
a processor to execute instructions in the memory to:
instruct the user equipment to measure at least one of a signal strength and/or a signal quality associated with the source RAT for a time period after the user equipment connects to the target RAT,
receive, from the user equipment, one or more measurement reports generated based on the measurements,
communicate information based on the one or more measurement reports of the user equipment from the target RAT to the source RAT,
determine that a handover to the target RAT was triggered too early based on one or both of strength/quality thresholds associated with the source RAT, and
provide, to the source RAT and based on the determination, a too early inter-RAT (IRAT) handover indication.

46. The device of claim 45, where the user equipment receives, from the source RAT, a command to handover the user equipment to the target RAT, the handover command is associated with a handover request, and the processor further executes instructions in the memory to:
connect the user equipment to the target RAT based on the handover command.

47. The device of claim 46, wherein the measurement reports are generated using a strength threshold and/or a quality threshold which is:
provided from the source RAT to the target RAT in the handover request,
provided to the target RAT in a message that is separate from the handover request, or
received from earlier handovers and stored in the target RAT.

48. The device of claim 45, where one or both of strength/quality thresholds associated with the source RAT are one of:
provided to the target RAT in a message, or
received from earlier handovers and stored in the target RAT.

49. The device of claim 45, where the processor further executes instructions in the memory to:
forward the one or more measurement reports to the source RAT, where the source RAT calculates a too early IRAT handover ratio based on the one or more measurement reports.

50. The device of claim 45, where the processor further executes instructions in the memory to:
determine that a handover to the target RAT was triggered too early based on one or both of strength/quality thresholds associated with the source RAT, and
command the user equipment to return to the source RAT.

* * * * *